US011640207B2

(12) United States Patent
Kanevsky et al.

(10) Patent No.: US 11,640,207 B2
(45) Date of Patent: May 2, 2023

(54) INTEGRATING HAPTIC ACTUATORS INTO MOBILE COMPUTING DEVICE ACCESSORIES

(71) Applicant: Google LLC, Mountain View, CA (US)

(72) Inventors: Dimitri Kanevsky, Ossining, NY (US); Artem Dementyev, Boston, MA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/468,465

(22) Filed: Sep. 7, 2021

(65) Prior Publication Data

US 2021/0405756 A1    Dec. 30, 2021

Related U.S. Application Data

(60) Provisional application No. 63/240,716, filed on Sep. 3, 2021.

(51) Int. Cl.
*G06F 3/01* (2006.01)
*H04M 1/04* (2006.01)

(52) U.S. Cl.
CPC .............. *G06F 3/016* (2013.01); *H04M 1/04* (2013.01)

(58) Field of Classification Search
CPC ........ G06F 3/016; G06F 1/1613; H04M 1/04; H04M 1/72409; H04M 1/185
USPC ...................................... 340/407.1
See application file for complete search history.

(56) References Cited

U.S. PATENT DOCUMENTS

| 9,741,215 | B2 | 8/2017 | Brav et al. |
| 9,851,805 | B2 | 12/2017 | Levesque et al. |
| 9,853,675 | B1 | 12/2017 | Chen |
| 2017/0134063 | A1 | 5/2017 | Lee |
| 2017/0230072 | A1* | 8/2017 | Kim ..................... A45C 11/00 |
| 2020/0063915 | A1* | 2/2020 | Lederer ................. F16M 13/04 |
| 2020/0253362 | A1* | 8/2020 | Ruddy .................... A45F 5/00 |
| 2020/0379593 | A1* | 12/2020 | de Vries ............. G06F 3/04842 |

(Continued)

FOREIGN PATENT DOCUMENTS

| GB | 2589700 A | * | 6/2021 | ............. G06F 3/011 |
| KR | 20190043045 | | 4/2019 | |
| WO | WO-2012170584 A1 | * | 12/2012 | ........... A61B 5/0022 |

OTHER PUBLICATIONS

"Haptic Generator", Retrieved at: https://developer.android.com/reference/android/media/audiofx/HapticGenerator—on Jun. 28, 2021, 11 pages.

(Continued)

*Primary Examiner* — Quan Zhen Wang
*Assistant Examiner* — Mancil Littlejohn, Jr.
(74) *Attorney, Agent, or Firm* — Colby Nipper PLLC

(57) ABSTRACT

Techniques, apparatuses, and systems are described for integrating haptic actuators into accessories for mobile computing device. Current accessory devices and their associated housings lack the necessary space to implement multiple haptic actuators for conveying complex haptic information. The accessory device attached to the mobile computing device provides additional space for integrating haptic actuators, which provide complex haptic information to a user of the mobile computing device. Using the haptic device accessory, the mobile computing device can convey haptic information to a user of the accessory device. In this way, a haptic device accessory can improve the otherwise limited haptic experience for a user of the accessory device.

20 Claims, 9 Drawing Sheets

(56) References Cited

U.S. PATENT DOCUMENTS

2021/0404901 A1* 12/2021 Kost ........................ G01L 25/00
2022/0159113 A1* 5/2022 Parish, Sr. .............. H04M 1/04

OTHER PUBLICATIONS

"Haptic Solutions for Wearable Devices", Retrieved at: file:///C:/Users/Sean.CN/DesktopHapticSolutionsforWearableDevices.pdf—on Jun. 18, 2021, 3 pages.

Dementyev, et al., "Haptics with Input: Back-EMF in Linear Resonant Actuators to Enable Touch, Pressure and Environmental Awareness", Oct. 2020, pp. 420-429.

Gilbert, "Wireless Charging Through a Collapsible Mobile Device Grip", Technical Disclosure Commons—http://www.tdcommons.org/dpubs_series/2476, Sep. 13, 2019, 8 pages.

\* cited by examiner

INTEGRATING HAPTIC ACTUATORS INTO MOBILE COMPUTING DEVICE ACCESSORIES

RELATED APPLICATION

This application claims priority to U.S. Provisional Patent Application Ser. No. 63/240,716 filed on Sep. 3, 2021, the disclosure of which is incorporated by reference herein in its entirety.

SUMMARY

This document describes techniques, apparatuses, and systems directed at integrating haptic actuators into accessories for mobile computing devices. The haptic actuators of the accessories can convey vibrotactile feedback to a user of the mobile computing device.

In general, a first aspect of the present disclosure relates to a mobile computing device accessory, or "accessory device," that integrates haptic actuators. The accessory device includes a housing and a connector to couple the housing of the accessory device to the mobile computing device (e.g., at an outer surface). The accessory device further includes a haptic controller, which further includes a network interface device, a microprocessor, and a haptic driver. The network interface device facilitates communication with the mobile computing device, which enables the accessory device to receive haptic information signals from the mobile computing device. The microprocessor generates haptic vibration waveforms (e.g., in response to receiving the haptic information signals from the mobile computing device). The haptic driver receives the generated haptic vibration waveforms from the microprocessor and generates an input drive signal (e.g., in response to the haptic vibration waveforms). Additionally, the accessory device includes at least one haptic actuator operatively connected to the haptic driver, the haptic actuator to receive the input drive signal and to output a haptic vibration associated with the input drive signal received from the haptic driver.

This Summary is provided to introduce simplified concepts for integrating haptic actuators into mobile computing device accessories, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of integrating haptic actuators into mobile computing device accessories are described in this document with reference to the following drawings.

The use of same numbers in different instances may indicate similar features or components.

DETAILED DESCRIPTION

Overview

This document describes techniques, apparatuses, and systems for integrating haptic actuators into mobile computing device accessories, herein referred to as "accessory devices." The techniques, apparatuses, and systems may use haptic actuators integrated into an accessory device connected to a mobile computing device to convey complex haptic information (e.g., vibrotactile feedback) to a user of the mobile computing device. By doing so, in some cases, the techniques, apparatuses, and systems may facilitate the provision, by the mobile computing device, of additional haptic information about some categories of events to the user while the user holds the mobile computing device in their hands. Due to cost and size constraints, a mobile computing device may only include a single vibrotactile actuator. Having a single vibrotactile actuator limits the usability of haptic feedback provided by the mobile computing device to simple notifications with limited feedback.

In contrast, consider the disclosed techniques, apparatuses, and systems, which integrate haptic actuators into accessory devices that connect to the mobile computing device. By integrating additional haptic actuators into an accessory device, increasingly nuanced haptic information may be conveyed to a user of the mobile computing device that could not be achieved by the mobile computing device alone. For example, haptic signals indicating multi-directional information may be conveyed to a user of the accessory device that otherwise could not be conveyed by a mobile computing device with a single haptic actuator. The accessory device may include one or more of a collapsible mobile device grip, a kickstand, or a phone case attached to the outside surface of the mobile computing device. Nuanced haptic signals, such as multi-direction haptic information, may be conveyed by integrating haptic actuators into the collapsible mobile device grip, kickstand, or phone case. These are but a few examples of how the described techniques, apparatuses, and systems may be used to integrate haptic actuators into accessory devices. Other examples and implementations are described throughout this document. The document now turns to an example operating environment, after which example devices, methods, and systems are described.

Operating Environment

Figure 1:
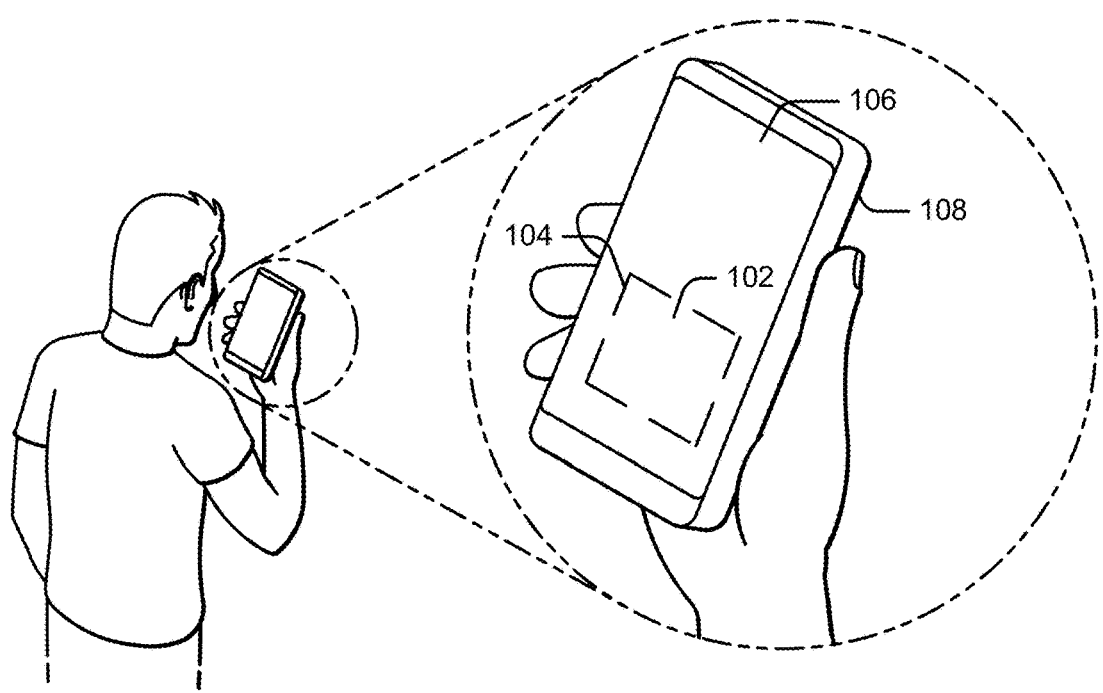
FIG. 1 illustrates an example operating environment in which techniques, apparatuses, and systems directed at integrating haptic actuators into mobile computing device accessories can be implemented.

The following discussion describes an operating environment, techniques that may be employed in the operating environment, and various devices or systems in which components of the operating environment can be embodied. In the context of the present disclosure, reference is made to the operating environment by way of example only. FIG. 1 illustrates an operating environment 100 in which techniques, apparatuses, and systems directed at integrating haptic actuators into accessory devices for mobile computing devices may be implemented. FIG. 1 illustrates an accessory device 102 (e.g., collapsible mobile device grip, kickstand, phone case) held by a user of the accessory device 102 with the user's fingers in contact with a housing 104 of the accessory device 102. The accessory device 102 is configured to convey haptic information from an attached mobile computing device 106 to the user. The housing 104 of the accessory device 102 is coupled to an outer surface 108 of the mobile computing device 106 (e.g., the back side of the mobile computing device 106). As illustrated, the mobile computing device 106 is a smartphone, but the mobile computing device 106 can be implemented as any suitable mobile computing device, including but not limited to smartphones, tablets, and wearable computing devices.

Computing Devices

Figures 2, 3:
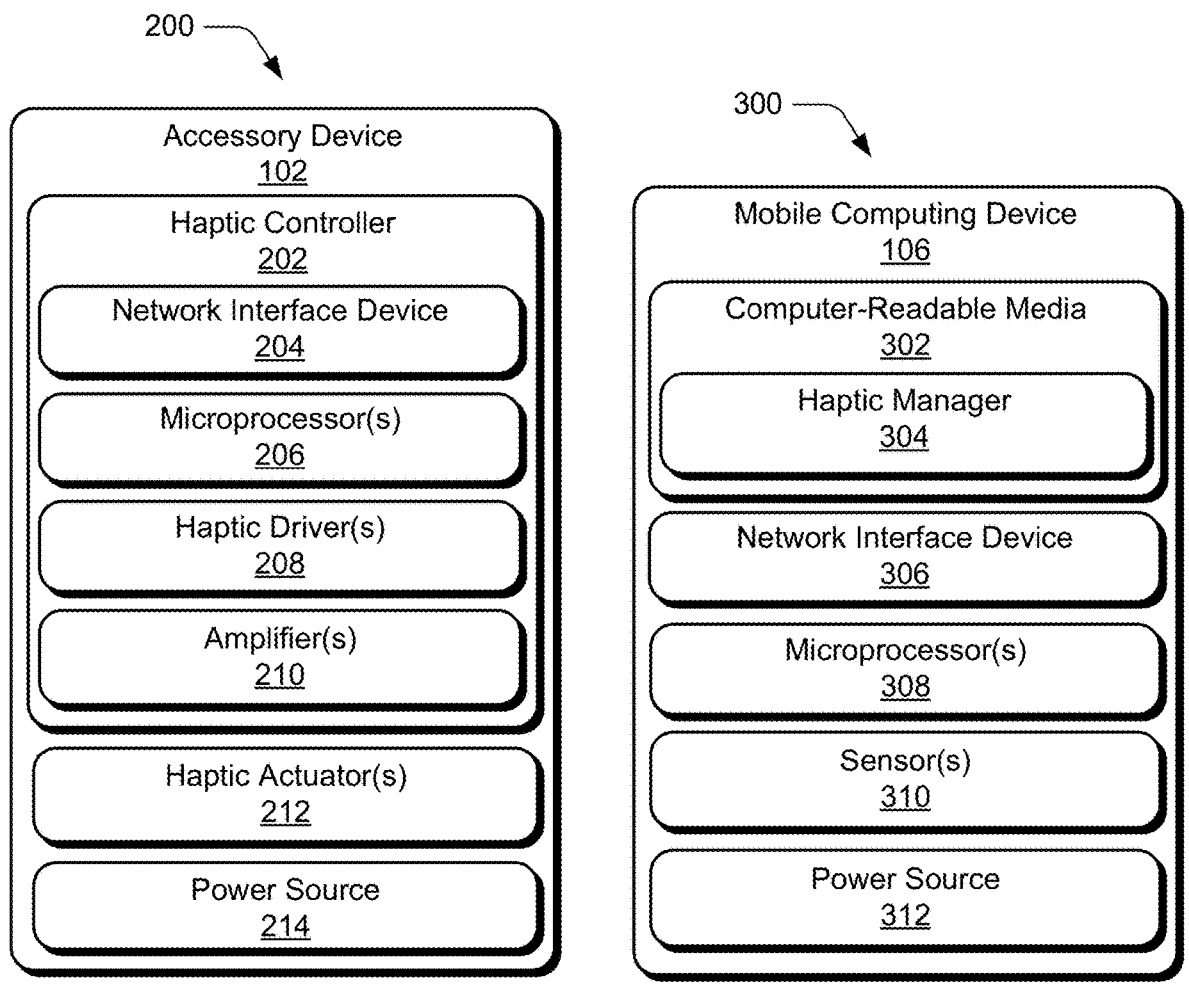
FIG. 2 illustrates an example implementation of an accessory device.
FIG. 3 illustrates an example implementation of a mobile computing device.

FIG. 2 illustrates an example implementation 200 of an accessory device 102 configured for use with a mobile computing device, such as the mobile computing device 106 of FIG. 1. The accessory device 102 includes a haptic controller 202 with a network interface device 204, a microprocessor 206, a haptic driver 208, and an amplifier 210. The accessory device 102 includes one or more haptic actuators 212 for conveying haptic information to a user of the accessory device 102. The accessory device 102 may further include a power source 214 (e.g., a wired connection to the mobile computing device 106, a battery).

FIG. 3 illustrates an example implementation 300 of a mobile computing device, such as the mobile computing device 106 of FIG. 1. The mobile computing device 106 includes computer-readable media (CRM) 302 and a haptic manager 304 stored on the CRM 302. The mobile computing device 106 includes a network interface device 306, one or more microprocessors 308, and one or more sensors 310 (e.g., location sensors, phone orientation sensors, haptic sensors). The mobile computing device 106 may include a power source 312 (e.g., a battery).

The entities of FIG. 2 and FIG. 3 may be further divided, combined, and used along with other sensors or components, and so on. In this way, different implementations of the accessory device 102, with different configurations of the mobile computing device 106, can be used for integrating haptic actuators into accessory devices. The example operating environment 100 of FIG. 1 and the detailed illustrations of FIG. 2 and FIG. 3 illustrate some of many possible environments and devices capable of employing the described techniques, apparatuses, and systems.

EXAMPLE APPARATUSES AND SYSTEMS

This section describes example apparatuses and systems for integrating haptic actuators into accessory devices, which may operate separately or together in whole or in part. Various accessory device examples are described, each set forth in a subsection for ease of reading; these subsection titles are not intended to limit the interoperability of each of these apparatuses and systems one with the other. In portions of the following discussion, reference may be made to the example operating environment 100 of FIG. 1 or to entities or processes as detailed in other figures (e.g., FIG. 2, FIG. 3), reference to which is made for example only. The described techniques, apparatuses, and systems are not limited to performance by one entity or multiple entities operating on one device.

Figure 4:
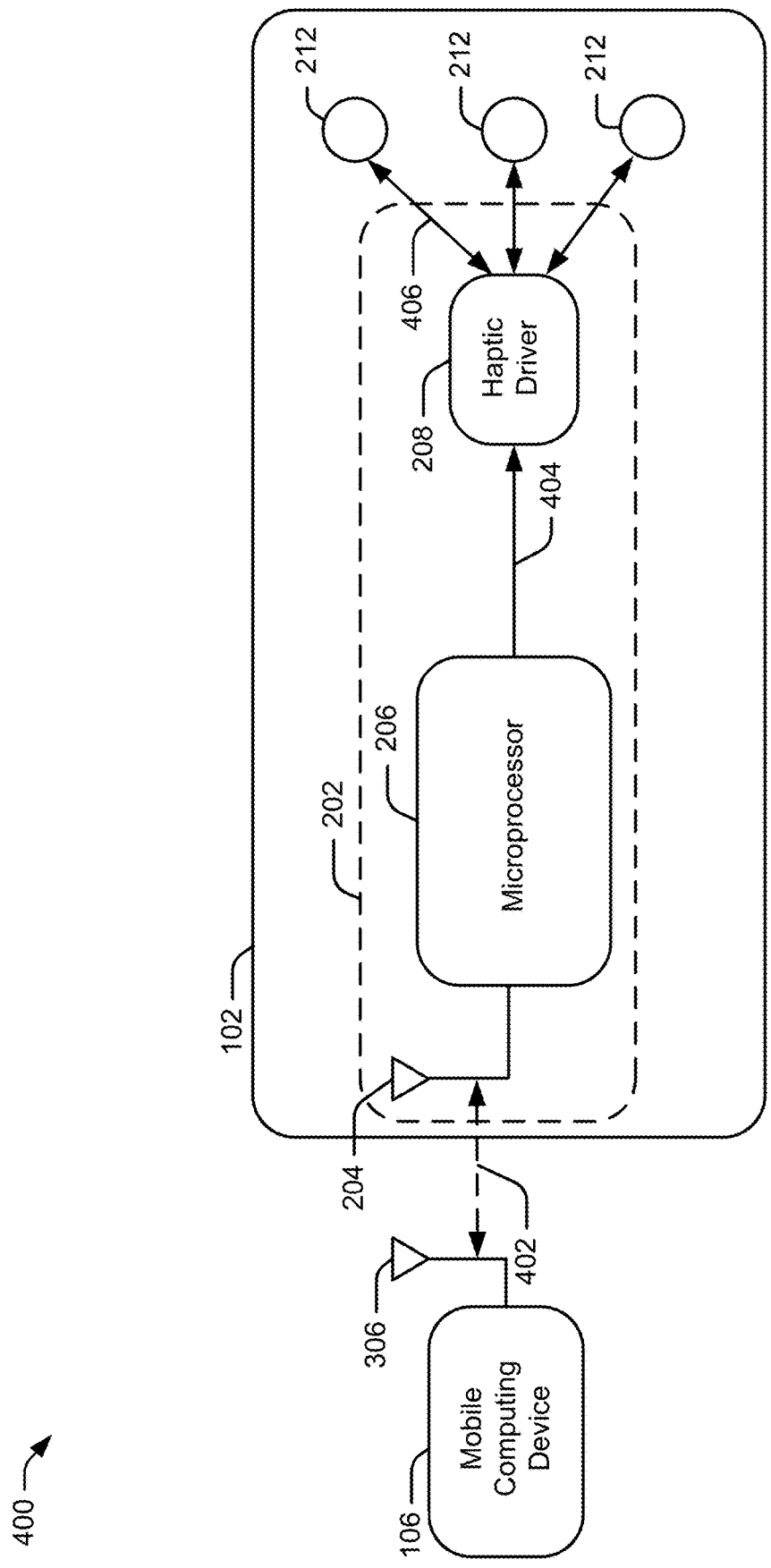
FIG. 4 illustrates an example system for integrating haptic actuators into accessory devices.

FIG. 4 illustrates an example system 400 for integrating haptic actuators into accessory devices (e.g., accessory device 102). The accessory device 102 includes a haptic controller 202, which may include a network interface device 204, a microprocessor 206, and a haptic driver 208. In the system 400 of FIG. 4, the accessory device 102, utilizing the network interface device 204, is able to send/receive communications 402 (e.g., haptic information signals) with the mobile computing device 106, which may have a network interface device 306. The network interface device 204 facilitates communication with the mobile computing device 106, enabling the accessory device 102 to receive haptic information signals from the mobile computing device 106. A suitable connection for sending/receiving the communications 402 may be established between the network interface device 204 and the network interface device 306, for example, a wireless connection (e.g., a Bluetooth connection) and/or a wired connection (e.g., a universal serial bus (USB) connection).

The microprocessor 206, can generate haptic vibration waveforms 404 for the haptic driver 208. The haptic vibration waveforms 404 may be generated in response to receiving the haptic information signals from the mobile computing device 106 utilizing a communication 402. The microprocessor 206 sends the haptic vibration waveforms 404 to the haptic driver 208. The haptic driver 208 (e.g., a digital-to-analog converter (DAC)) receives generated haptic vibration waveforms 404 from the microprocessor 206 and generates an input drive signal 406. The input drive signal 406 may be generated responsive to receiving the haptic vibration waveforms 404. The input drive signal 406 is sent to at least one haptic actuator 212. The haptic actuator 212 (e.g., voice coil actuator, linear resonant actuator, piezoelectric actuator, exciter speaker) receives the input drive signal 406. The input drive signal 406 causes the haptic actuator 212 to output a haptic vibration. The accessory device 102 may include a housing configured for coupling to an outer surface 108 of the mobile computing device 106. One or more of the haptic controllers 202 or the haptic actuators 212 may be integrated into the housing 104.

Figure 5A:
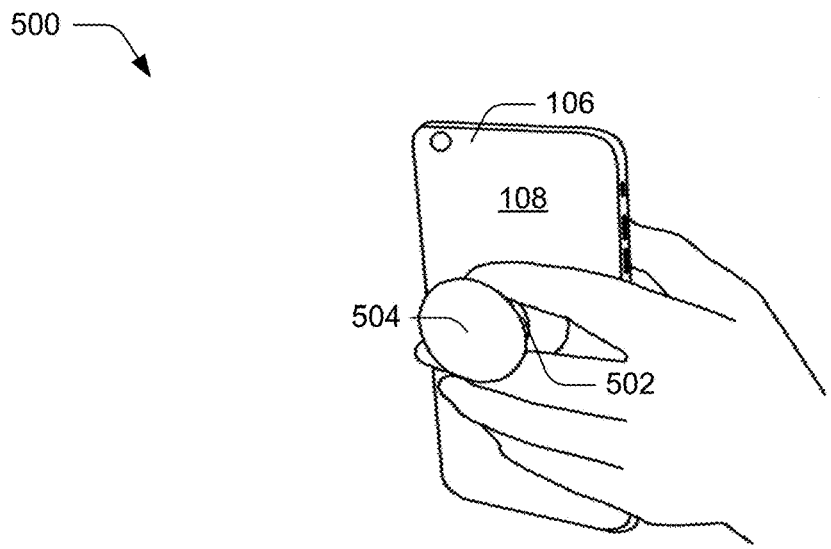
FIG. 5A is a rear perspective environmental view of a second example implementation of an accessory device and a mobile computing device.

FIGS. 5A-5D illustrate an example implementation 500 of an accessory device 502 (e.g., accessory device 102), configured as a collapsible mobile device grip attached to a mobile computing device 106. As illustrated in FIG. 5A, the accessory device 502 is configured to be held by a user of the mobile computing device 106, which has an outer surface 108 with which the accessory device 502 is coupled (e.g., adhesively fastened), at a base 520 operating as a connector. The collapsible mobile device grip illustrated in FIGS. 5A-5D includes a lid 504, the base 520, and a sidewall 522.

Figure 5B:
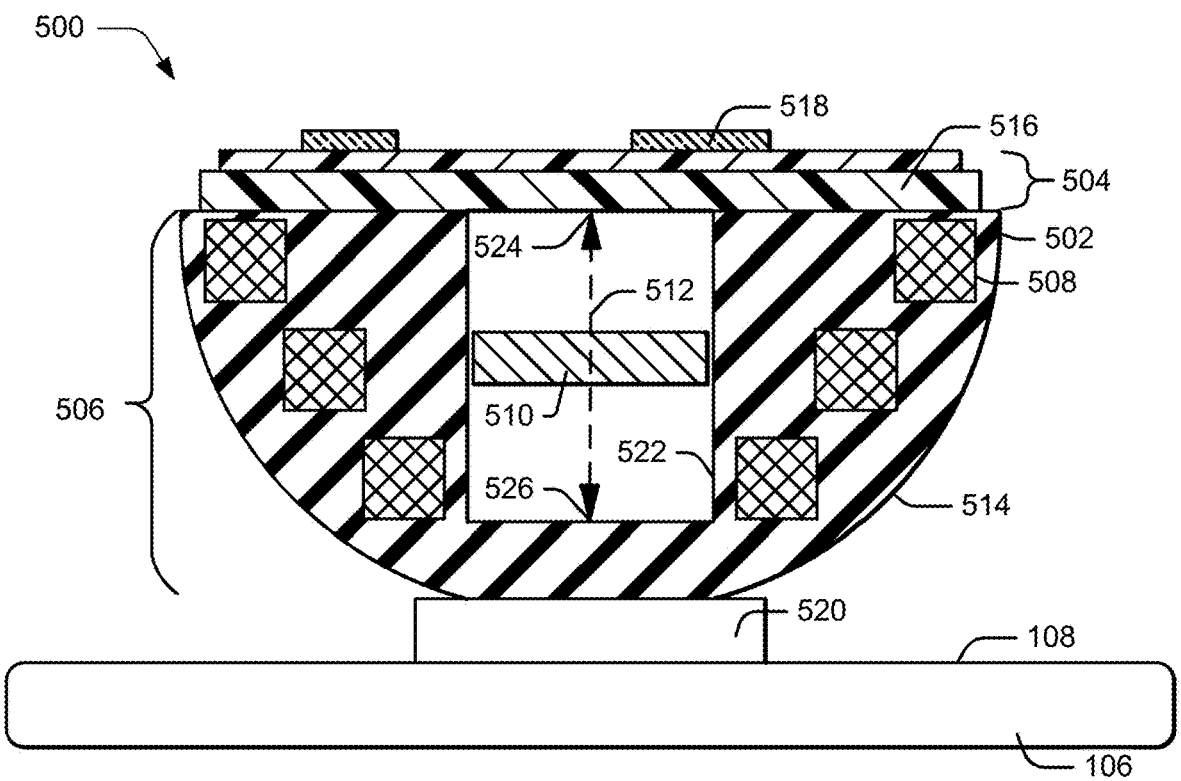
FIG. 5B is a left side schematic view of the accessory device of FIG. 5A, illustrating the accessory device in an expanded position.
Figure 5C:
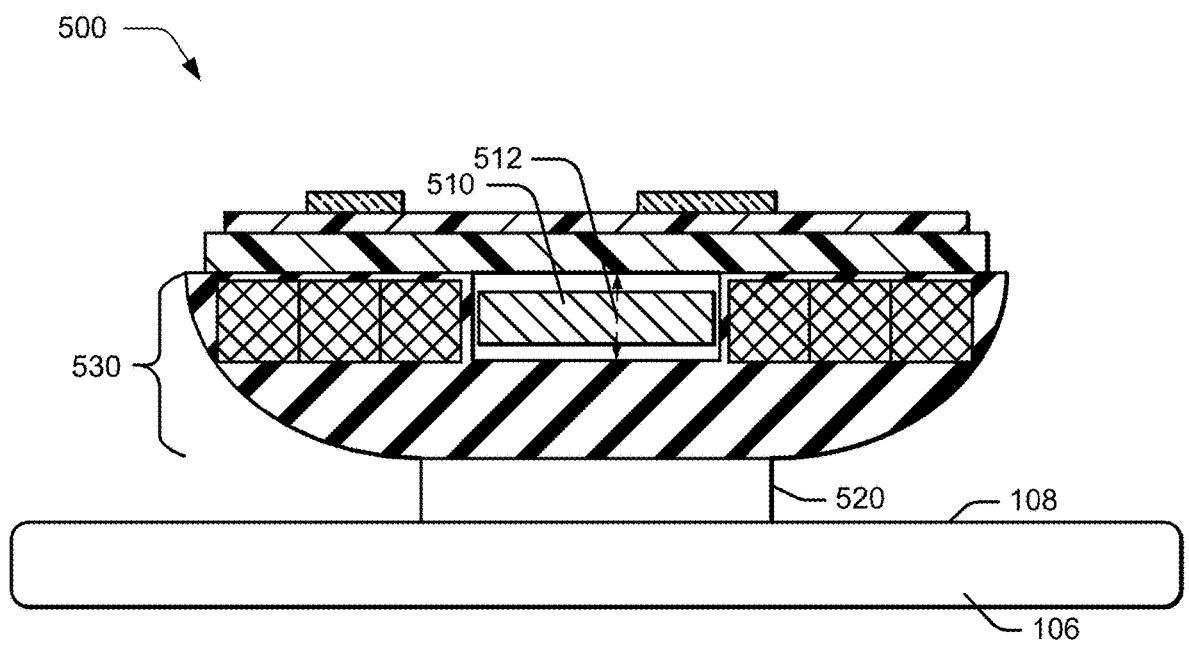
FIG. 5C is a left side schematic view of the accessory device of FIG. 5B, illustrating the accessory device in a collapsed position.

FIG. 5B illustrates a side schematic view of the accessory device 502 in an expanded position 506 and FIG. 5C illustrates a side schematic view of the accessory device 502 in a collapsed position 530. The accessory device 502 may include magnet wire 508 and a permanent magnet 510 operating as a voice coil actuator. An input drive signal 406 introduces current changes in the magnet wire 508, resulting in the permanent magnet 510 moving along a vertical axis 512. The movement of the permanent magnet 510 generates haptic effects (e.g., vibrations) that convey haptic information (e.g., vibrotactile information) to a user of the accessory device 502. The travel distance of the permanent magnet 510 along the vertical axis 512 may allow for significant variation in the type of haptic effects provided to a user of the accessory device 502. The permanent magnet 510 may travel along the vertical axis 512 toward the lid 504 and/or toward the base 520 of the accessory device 502.

The lid 504 may be opposite the base 520 as well as perpendicular to a sidewall 522 housing the permanent magnet 510. The sidewall 522 may extend between the base 520 and the lid 504. The sidewall 522 positionable between the collapsed position 530 (illustrated in FIG. 5C) with the sidewall 522 compressed and the base 520 proximal to the lid 504, as well as an expanded position 506 (illustrated in FIG. 5B) where the sidewall 522 is uncompressed with the base 520 distal to the lid 504. The permanent magnet 510 may be configured for movement along the vertical axis 512 between a first position 524 and a second position 526. The travel distance of the permanent magnet 510 along the vertical axis 512, as well as the sidewall 522 length, is reduced in the collapsed position 530. The base 520, lid 504, and sidewall 522 may be included in an expandable holder 514 for the accessory device 502. The accessory device 502 may couple to the housing of the mobile computing device 106 at the base 520, for example, the accessory device 502 may be configured for use as a stand for the mobile computing device 106 or held between fingers of a user.

One or more of the components of the accessory device 502 may be mounted on a printed circuit board (PCB) 516. In aspects, the PCB 516 may include a microprocessor 518, a network interface device (e.g., network interface device 204) having Bluetooth capabilities (e.g., Bluetooth system-on-a-chip), a haptic driver (e.g., haptic driver 208) and a power source (e.g., a power source 214). The haptic driver may include an amplifier (e.g., a class-D amplifier). The power source may include a battery charger circuit in combination with a battery (e.g., a thin circular lithium polymer battery) attached to the lid 504 of the accessory device 502. In aspects, the configuration of the accessory device 502 does not require a physical connection to the mobile computing device 106 as wireless communication may occur through Bluetooth (e.g., Bluetooth Low-Energy).

Figure 5D:
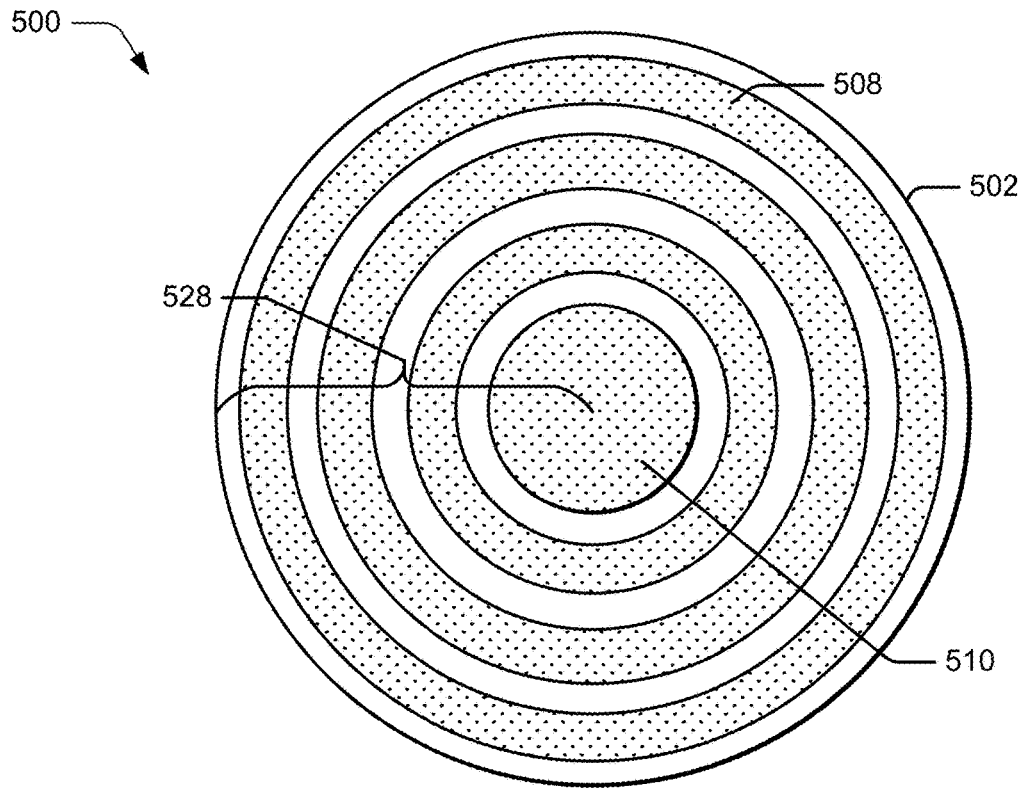
FIG. 5D illustrates a top plan, schematic representation of the second example implementation of an accessory device of FIG. 5A.

FIG. 5D illustrates a top schematic representation of the collapsible mobile device grip of FIG. 5A. As shown in the top view, a collapsible voice coil actuator 528, may include a series of magnet wires 508 of increasing circumference arranged as concentric circles about the permanent magnet 510. The magnet wire 508 may be modified in different arrangements about the permanent magnet 510 (e.g., two sections, four sections, five sections). The collapsible voice coil actuator 528 may be implemented with different coils, magnet geometries, and configurations in accordance with the type of accessory device 502 within which it is housed.

Figure 6:
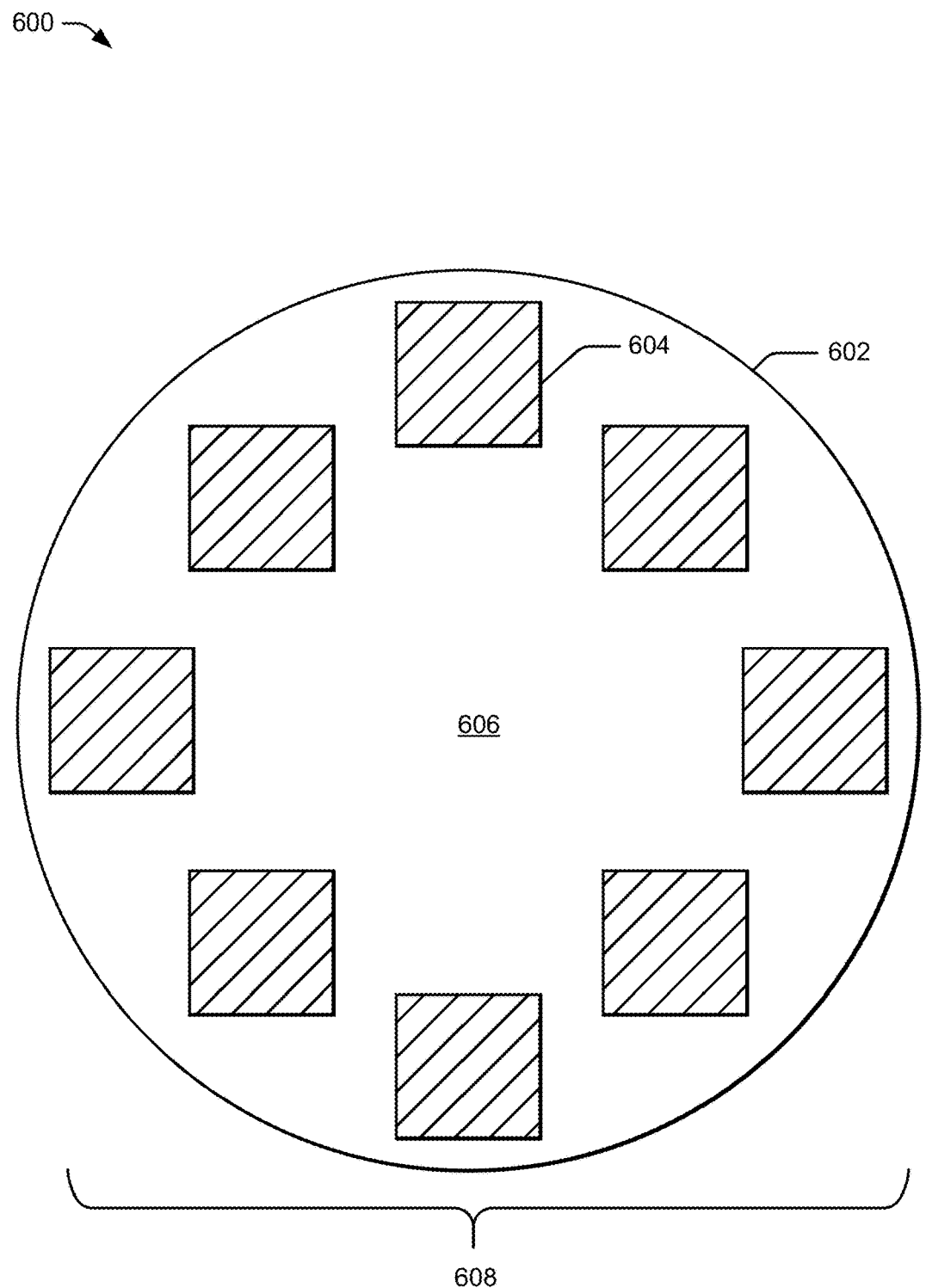
FIG. 6 is a top plan, schematic representation of an example third accessory device.

FIG. 6 illustrates a top plan, schematic representation 600 of another example accessory device 602 configured as a collapsible mobile device grip. As shown in FIG. 6, an arrangement of linear resonant actuators 604 are provided adjacent a surface 606 of the accessory device housing 608 (e.g., beneath a lid 504). The linear resonant actuators 604 can provide tactile directional information to a user of the accessory device 602 whose fingers are in contact with the accessory device housing 608. The arrangement of linear resonant actuators 604 may enhance the amount of haptic information that can be conveyed to a user of the accessory device 602 by utilizing space on the accessory device housing 608 otherwise unavailable on the mobile computing device 106.

Figure 7A:
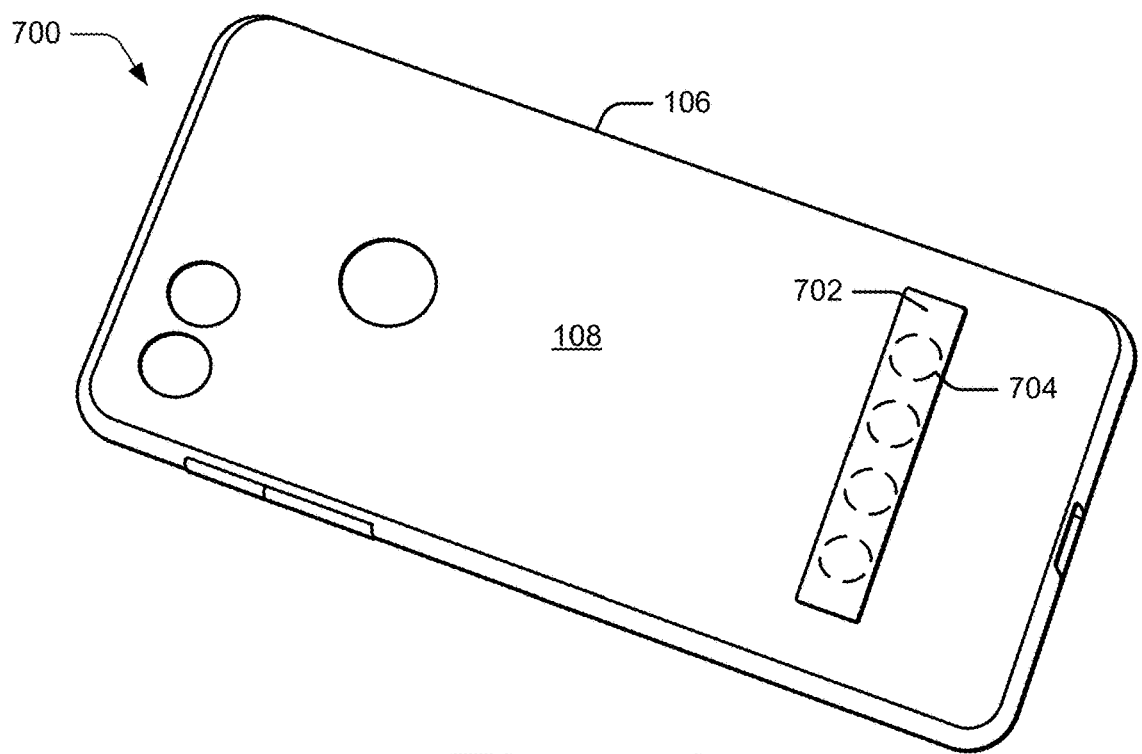
FIG. 7A is a rear perspective environmental view of an example fourth implementation of an accessory device and a mobile computing device, illustrating a kickstand of the accessory device in a collapsed position.
Figure 7B:
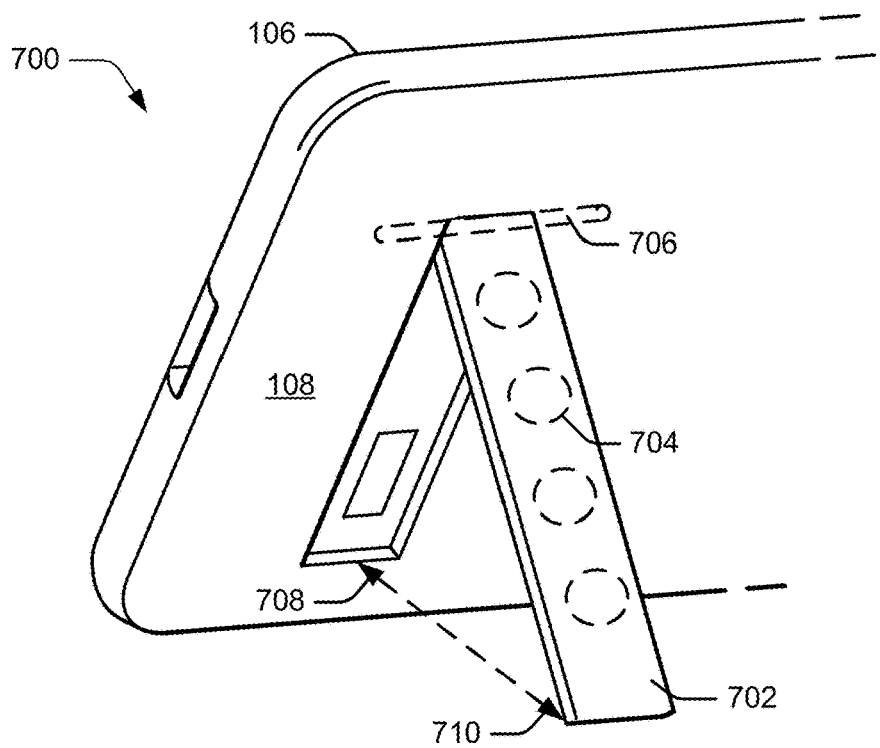
FIG. 7B is a rear perspective view of the accessory device and mobile computing device of FIG. 7A, illustrating the kickstand of the accessory device in an extended position.

FIGS. 7A and 7B illustrate an example implementation 700 of an accessory device 702 (e.g., accessory device 102) as a kickstand. The accessory device 702 may be hingedly coupled with the housing of the outer surface 108 of the mobile computing device 106 as illustrated in FIG. 7A. The accessory device 702 can be collapsed and held in contact with a user's fingers to convey vibrotactile information through one or more haptic actuators 704 arranged along the accessory device 702. The accessory device 702 may be positioned between a collapsed position coplanar with the outer surface 108 (illustrated in FIG. 7A) and an extended position oriented at an angle to the outer surface 108 of the mobile computing device 106 (illustrated in FIG. 7B). The accessory device 702 may further operate to angle the mobile computing device 106 for the user to view without use of their hands.

FIG. 7B illustrates a rear perspective view of the accessory device and mobile computing device of FIG. 7A, illustrating the kickstand of the accessory device in an extended position. The accessory device 702 is pivotally coupled with the housing outer surface 108 of the mobile computing device 106 through a hinge connector 706. The accessory device 702 may pivotally travel between a first position 708 and a second position 710. The accessory device 702 in the first position 708 (illustrated in FIG. 7A) may convey vibrotactile information to a user of the mobile computing device 106 whose fingers are aligned along the accessory device 702. The accessory device 702 in the second position 710 (illustrated in FIG. 7B) may angle the mobile computing device 106 for the user to view the accessory device 702 with or without use of their hands. The one or more haptic actuators 704 allow for transmission of nuanced vibrotactile feedback to a user of the mobile computing device 106 in the first position 708 and second position 710, as well as positions between the first position 708 and second position 710.

Figure 8:
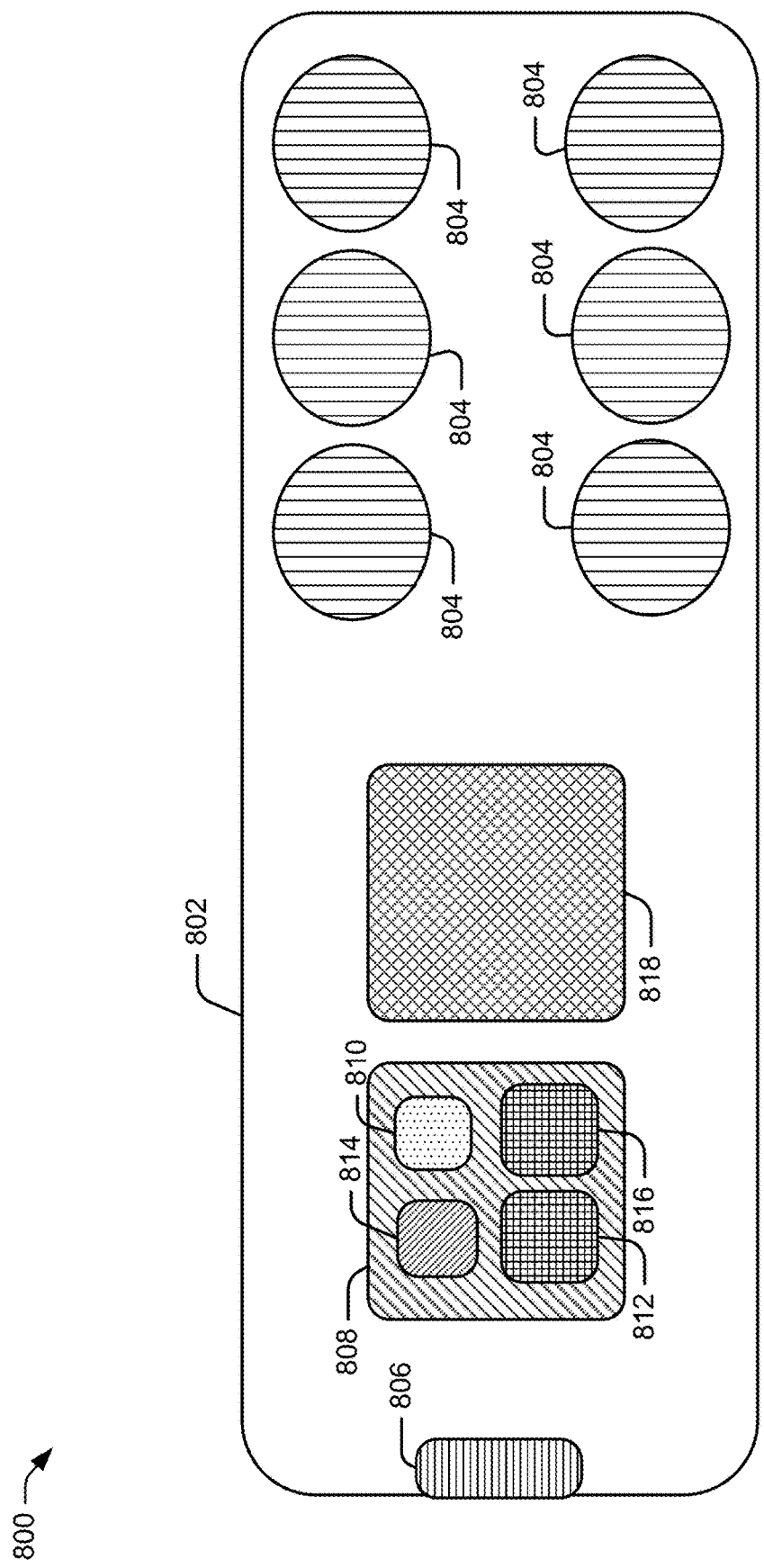
FIG. 8 is a top plan, schematic representation of an example fifth implementation of an accessory device.

FIG. 8 illustrates a top plan, schematic representation of an additional example implementation 800 of an accessory device 802, implemented as a kickstand. The example implementation 800 could be implemented with a kickstand as illustrated in FIGS. 7A and 7B. The accessory device 802 includes one or more haptic actuators 804 (e.g., linear resonant actuators) capable of conveying vibrotactile information. The accessory device 802 includes a charge port 806. The charge port 806 maintains an electrical current to a battery 818 for the electrical components of the accessory device 802. The charge port 806 could include a USB-C charge port configured for connecting to a charge cable attached to a power source. The accessory device 802 may include a PCB 808 including an amplifier 810 (e.g., a class-D amplifier) to amplify the haptic vibration waveforms received from a microprocessor 814 and to output the amplified haptic vibration waveforms to the one or more haptic actuators 804 as well as a network interface device and haptic controller 812 (e.g., a Bluetooth device and microcontroller system on a chip). The accessory device 802 may include a haptic driver 816 to receive the generated haptic vibration waveforms from the microprocessor 814 and to generate an input drive signal for the one or more haptic actuators 804. The accessory device 802 may integrate and communicate with the mobile computing device 106 through a wired connection utilizing the charge port 806.

EXAMPLE SYSTEM

Figure 9:
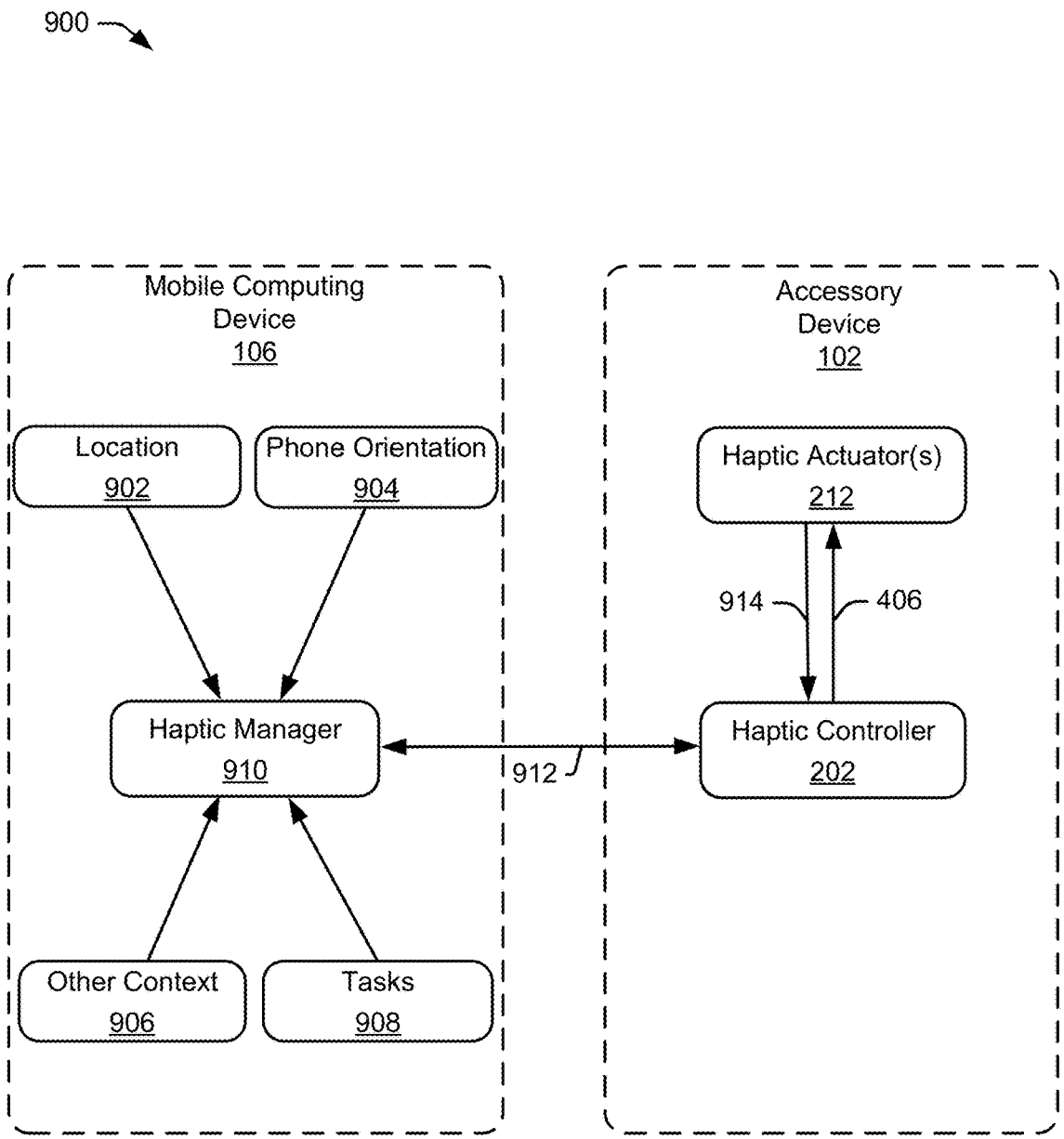
FIG. 9 is a schematic representation of a system for integrating haptic actuators into mobile computing device accessories.

FIG. 9 illustrates a system 900 shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. As shown in FIG. 9, the mobile computing device 106 includes a haptic manager 910 (e.g., haptic manager 304) that receives inputs, which may include location input 902 (e.g., global positioning system (GPS) location of the mobile computing device 106), phone orientation input 904 (e.g., horizontal to the user, vertical to the user), other contextual input 906, and input related to tasks 908 received from applications on the mobile computing device 106. One or more of the inputs may be received from a sensor on the mobile computing device 106.

The haptic manager 910 may also receive information (e.g., finger location position information) from the haptic controller 202 of the accessory device 102 regarding tactile information of a user in contact with the one or more haptic actuators 212 of the accessory device 102. The haptic manager 910 may generate and transmit communications 912 (e.g., communications 402) such as haptic information signals over a wireless connection (e.g., Bluetooth) or a wired connection to the haptic controller 202 of the accessory device 102. Similarly, the haptic controller 202 of the accessory device 102 may generate and transmit communications 912 over a wireless connection (e.g., Bluetooth) or a wired connection to the haptic manager 910 of the mobile computing device 106. The haptic controller 202 may receive the communications 912 (e.g. haptic information signals) and generate an input drive signal 406 for the one or more haptic actuators 212.

A mobile computing device 106 may establish finger location position information as well as force of grip of the user by generating haptic information from the one or more haptic actuators 212 in contact with the user. The one or more haptic actuators 212 may sense a finger location position information of a user in contact with the accessory device 102 and generate corresponding finger location position information. The force of the grip of the user in contact with the one or more haptic actuators 212 may be sensed using techniques such as current loading sensing, capacitive sensing, or infrared proximity sensing. The user's grip may be sensed directly by the haptic actuators 212 without incorporating additional sensors. In aspects, each haptic actuator 212 may sense whether a user is in contact with the accessory device 102 as well as the force of the contact by the user.

The patterns of vibrotactile feedback provided to the user by the mobile computing device 106 can be modified based on the finger location position information as well as the grip of the user in contact with the accessory device 102. The one or more haptic actuators 212 may generate and transmit finger location position information and force of grip information as communications 914 to the haptic controller 202 which may transmit the information to as communications 912 to the haptic manager 910 of the mobile computing device 106. The haptic controller 202 may send the communications 912 through a network interface device (e.g., a network interface device 204) to the mobile computing device 106. The mobile computing device 106 generates nuanced haptic signals from the communications 912 sent by the haptic controller 202 of the accessory device 102. Nuanced haptic signals conveyed through the accessory device 102 would be otherwise restricted by the limited haptic capabilities of the mobile computing device 106 alone.

An example implementation of the system 900 includes a tactile navigation device with multiple vibrotactile actuators capable of providing spatial (e.g., directional) vibrotactile feedback. If a user's fingers are completely in contact with the haptic device accessory while conducting a navigation task, the user can activate the haptic manager 910 to indicate the direction for the user (e.g., left, right, straight ahead, back, or thirty degrees north-west). If the user's fingers are not completely in contact with the mobile computing device 106, the accessory device 102 can convey a single pulse repetitively (e.g., one pulse instructs the user to move left, two pulses instruct the user to move ahead, etc.) or a chain of pulses directed at individual fingers (e.g., a pulse moves from one finger on the left to another finger on the right, thereby instructing the user to move thirty degrees north-west).

Conclusion

Although concepts of techniques, apparatuses, and systems, including integrating haptic actuators into accessory devices, have been described in language specific to techniques, apparatuses, and/or systems, it is to be understood that the subject of the appended claims is not necessarily limited to the specific techniques, apparatuses and systems described. Rather, the specific techniques, apparatuses, and systems are disclosed as example implementations of ways in which integrating haptic actuators into accessory devices may be implemented.

What is claimed is:

1. An accessory device for a mobile computing device, the accessory device comprising:
    a housing;
    a connector to couple the housing of the accessory device to an outer surface of the mobile computing device;
    a haptic controller integrated into the housing, the haptic controller comprising:
        a network interface device to facilitate communication with the mobile computing device, the network interface device to receive haptic information signals from the mobile computing device;
        a microprocessor to generate haptic vibration waveforms in response to receiving the haptic information signals from the mobile computing device; and
        a haptic driver to receive the generated haptic vibration waveforms from the microprocessor and to generate an input drive signal in response to the generated haptic vibration waveforms; and
    a haptic actuator operatively connected to the haptic driver, the haptic actuator to receive the input drive signal and to output a haptic vibration associated with the input drive signal received from the haptic driver, the haptic actuator integrated into the housing,
    the housing comprising an expandable holder, the expandable holder comprising:
        a base to connect with the outer surface of the mobile computing device at the connector;
        a lid opposing the base; and
        a sidewall extending between the base and the lid, the sidewall positionable between a collapsed position in which the sidewall is compressed with the base proximal to the lid and an expanded position in which the sidewall is uncompressed with the base distal to the lid.

2. The accessory device of claim 1, wherein the haptic actuator comprises a collapsible voice coil, the collapsible voice coil comprising:
   a permanent magnet, the permanent magnet to move along a vertical axis between a first position and a second position; and
   a series of magnet wires, the series of magnet wires arranged as concentric circles about the permanent magnet.

3. The accessory device of claim 1, wherein the haptic actuator comprises a plurality of linear resonant actuators positioned adjacent to the lid for providing tactile direction information to a user of the accessory device.

4. The accessory device of claim 1, wherein:
   the haptic actuator is to sense a finger location of a user of the accessory device and generate corresponding finger location position information;
   the haptic actuator is to output to the haptic controller the finger location position information; and
   the haptic controller is to send, utilizing the network interface device, the finger location position information to the mobile computing device.

5. The accessory device of claim 1, wherein the haptic controller further comprises:
   a digital-to-analog converter to output the generated haptic vibration waveforms received from the microprocessor.

6. The accessory device of claim 1, wherein the haptic driver comprises:
   an amplifier to amplify the generated haptic vibration waveforms received from the microprocessor and to output amplified haptic vibration waveforms to the haptic actuator.

7. The accessory device of claim 1, wherein the haptic actuator comprises at least one:
   linear resonant actuator;
   piezoelectric actuator; or
   exciter speaker.

8. The accessory device of claim 6, wherein the amplifier comprises a Class-D amplifier.

9. The accessory device of claim 1, wherein the haptic actuator comprises multiple vibrotactile actuators.

10. The accessory device of claim 1, further comprising:
    a power source attached to the lid, the power source comprising a battery charger circuit and a battery.

11. The accessory device of claim 1, further comprising:
    multiple haptic actuators including the haptic actuator, the multiple haptic actuators arranged in a circle around the sidewall at the lid.

12. An accessory device for a mobile computing device, the accessory device comprising:
    a housing;
    means for coupling the housing of the accessory device to an outer surface of the mobile computing device;
    a haptic controller integrated into the housing, the haptic controller comprising:
       a network interface device to facilitate communication with the mobile computing device, the network interface device to receive haptic information signals from the mobile computing device;
       a microprocessor to generate haptic vibration waveforms in response to receiving the haptic information signals from the mobile computing device; and
       means for generating an input drive signal in response to the generated haptic vibration waveforms that are received from the microprocessor; and
    means for outputting a haptic vibration associated with the input drive signal that is received from the means for generating, the means for outputting integrated into the housing and operatively connected to the means for generating,
    the housing comprising an expandable holder, the expandable holder comprising:
       a base to connect with the outer surface of the mobile computing device at the means for coupling;
       a lid opposing the base; and
       a sidewall extending between the base and the lid, the sidewall positionable between a collapsed position in which the sidewall is compressed with the base proximal to the lid and an expanded position in which the sidewall is uncompressed with the base distal to the lid.

13. An accessory device for a mobile computing device, the accessory device comprising:
    a housing;
    a connector to couple the housing of the accessory device to an outer surface of the mobile computing device;
    a haptic controller integrated into the housing, the haptic controller comprising:
       a network interface device to facilitate communication with the mobile computing device, the network interface device to receive haptic information signals from the mobile computing device;
       a microprocessor to generate haptic vibration waveforms in response to receiving the haptic information signals from the mobile computing device; and
       a haptic driver to receive the generated haptic vibration waveforms from the microprocessor and to generate an input drive signal in response to the generated haptic vibration waveforms; and
    a haptic actuator operatively connected to the haptic driver, the haptic actuator to receive the input drive signal and to output a haptic vibration associated with the input drive signal received from the haptic driver, the haptic actuator integrated into the housing,
    the connector comprising a hinge connector for hingedly coupling the housing to the outer surface of the mobile computing device;
    the housing comprising a kickstand coupled to the outer surface of the mobile computing device at the connector, the kickstand positionable between a collapsed position coplanar with the outer surface of the mobile computing device and an extended position oriented at an angle to the outer surface of the mobile computing device; and
    the haptic actuator integrated into the kickstand.

14. The accessory device of claim 13, further comprising:
    a charge port connected to the housing of the accessory device, the charge port to connect to a charge cable.

15. The accessory device of claim 14, further comprising:
    a battery connected to the haptic controller and the haptic actuator,
    wherein the charge port is to maintain an electrical current to the battery.

16. The accessory device of claim 13, wherein:
    the haptic actuator is to sense a finger location of a user of the accessory device and generate corresponding finger location position information;
    the haptic actuator is to output to the haptic controller the finger location position information; and
    the haptic controller is to send, utilizing the network interface device, the finger location position information to the mobile computing device.

17. The accessory device of claim 16, wherein:
the haptic actuator is to sense a force of a grip of the user of the accessory device.

18. The accessory device of claim 13, further comprising:
multiple haptic actuators including the haptic actuator, the multiple haptic actuators arranged in a line along the kickstand.

19. The accessory device of claim 18, wherein the multiple haptic actuators are arranged in two lines along the kickstand.

20. The accessory device of claim 13, wherein the haptic actuator comprises a plurality of linear resonant actuators positioned on the kickstand to provide tactile direction information to a user of the accessory device.

* * * * *